July 21, 1942.   O. K. KJOLSETH   2,290,643
RAILWAY TRUCK CONSTRUCTION
Filed June 18, 1941

Inventor:
Ole K. Kjolseth,
by Harry E. Dunham
His Attorney.

Patented July 21, 1942

2,290,643

UNITED STATES PATENT OFFICE 2,290,643

RAILWAY TRUCK CONSTRUCTION

Ole K. Kjolseth, Erie, Pa., assignor to General Electric Company, a corporation of New York Application June 18, 1941, Serial No. 398,615

3 Claims. (Cl. 105—131)

My invention relates to trucks for electrically propelled vehicles of the type having a driving motor and driving connections between the motor and the wheels of the vehicle which are carried by a truck frame spring borne on the wheels and axles, so that the unsprung weight of the truck is reduced to a minimum.

An object of my invention is to provide a railway truck having an improved arrangement of the motor and driving connections between the motor and the axle.

Another object of my invention is to provide an improved and simplified truck for a self-propelled railway vehicle.

Further objects and advantages of my invention will become apparent and my invention will be better understood from the following description referring to the accompanying drawing, and the features of novelty which characterize my invention will be pointed out with particularity in the claims annexed to and forming part of this specification.

Figure 1:
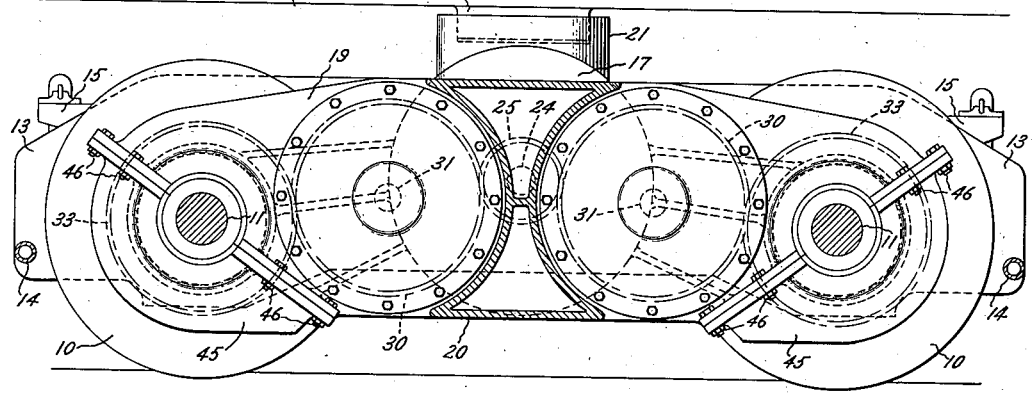
Figure 2:
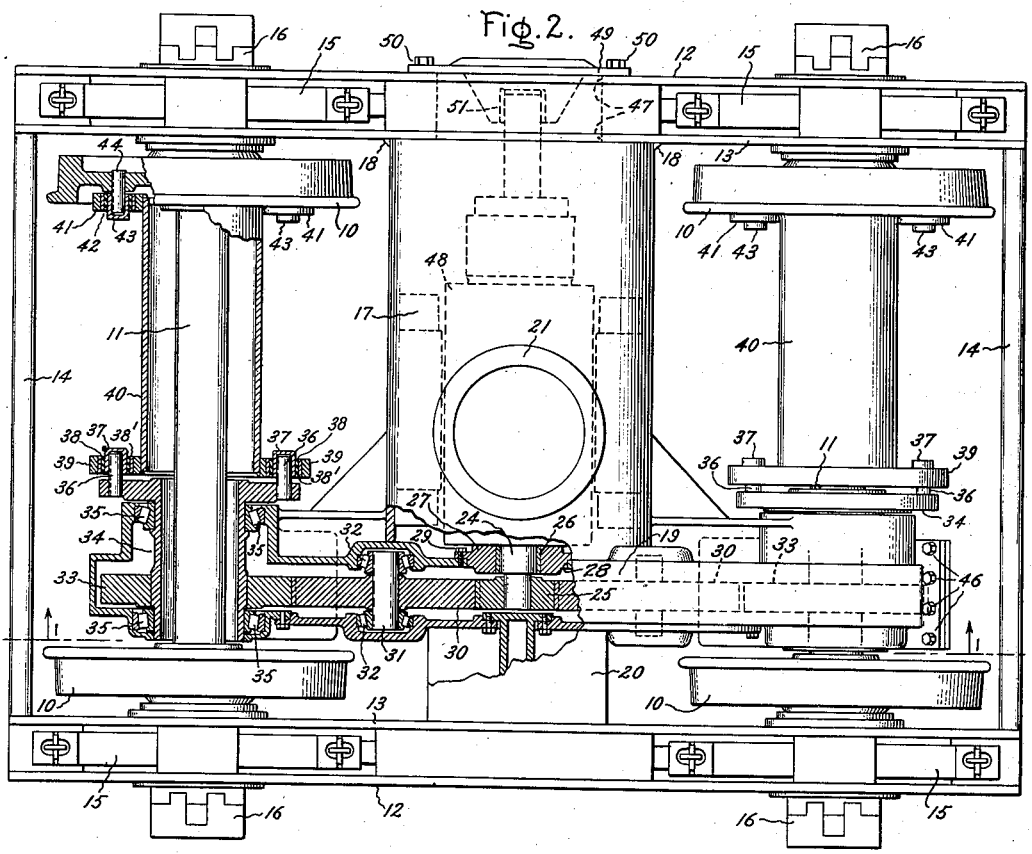

In the drawing, Fig. 1 is a side elevational view of a railway truck embodying my invention, broken away along line 1—1 of Fig. 2; and Fig. 2 is a plan view of the truck shown in Fig. 1, partly broken away to illustrate the driving connections between the driving motor and the wheels of the truck.

Referring to the drawing, I have shown a truck for a self-propelled railway vehicle provided with driving wheels 10 mounted on axles 11. The truck includes a fabricated frame construction adapted to be resiliently supported on the axles 11 in a manner such that a minimum of the weight of the truck is carried as unsprung weight on the axles 11. Longitudinally extending side frame members 12 and 13 are arranged on each side of the truck and are connected together at their ends by tubular members 14 forming end frames extending on the outside of the wheels 10 and providing a rigid substantially rectangular outer frame structure. This frame structure is supported by a flexible spring rigging 15 on journal boxes 16 which provide axle bearings for each end of each axle.

My improved construction is particularly adaptable to railway trucks provided with a plurality of driving axles, and in the construction shown in the drawing, the truck is provided with a pair of axles arranged to be driven by an electric motor arranged centrally between the two axles and extending transversely between the side frames of the truck. The motor is provided with a frame 17 forming a transom for the truck secured by welding at 18 to the side frame at one side of the truck and secured to the side frame on the other side of the truck through a longitudinally extending gear casing 19 and a supporting bracket 20. The motor frame 17 is provided with a center bearing plate 21 which is arranged to support a complementary center bearing 22 connected to the underframe 23 of the railway vehicle. In this manner, the weight of the vehicle is transferred directly through the motor frame to the side frames of the truck and is resiliently supported by the spring rigging 15 on the axles 11.

In order further to minimize the unsprung weight of the truck, the gear casing 19 is adapted to support a reduction gearing which connects the driving motor to the axles 11. The motor is provided with a drive shaft 24 which is operatively connected to a spur gear 25. The shaft 24 is supported adjacent the gear 25 by a bearing 26 mounted in a bearing bracket 27 arranged in an opening 28 in the gear casing 19 and removably secured to the casing by bolts 29. The opening 28 is formed larger than the gear 25 in order to facilitate removal of the gear from the gear casing by withdrawing it axially through the opening 28. The spur gear or pinion 25 is arranged to drive the axles 11 through reduction gearing which includes an idler gear 30 arranged one on each side of the pinion gear 25. Each gear 30 is mounted on a shaft 31 supported by roller bearings 32 mounted in bearing housings formed in the gear casing 19. Each idler gear 30 meshes with a reduction gear 33 mounted on a quill shaft coupling member 34 arranged in spaced relationship about an end of each of the axles 11. Each quill shaft coupling 34 is rotatably supported by roller bearings 35 mounted in the gear casing 19 and is provided with a plurality of driving pins 36 which extend into cup-shaped coupling elements 37 mounted in rubber members 38 vulcanized to bushings 38', which are arranged in a complementary coupling member 39 secured to the adjacent end of a quill shaft 40 providing a driving and supporting connection therewith. This construction provides a flexible cushioned driving connection between each quill shaft 40 and the motor driving shaft 24 through the reduction gearing and the quill shaft coupling members 34, thereby minimizing the transmission of jars and shocks from the quill shafts 40 to the driving motor and further minimizes the unsprung weight of the truck by supporting an end of each of the quill shafts and the quill shaft couplings on the gear casing 19. Each quill shaft 40 is arranged in radially spaced apart relationship about one of the axles 11 and is arranged to provide a flexible driving connection with the truck wheels 10. This driving connection includes a coupling arrangement similar to that which connects each quill shaft 40 to its quill shaft coupling 34. An annular coupling element 41 is rigidly mounted on the end of each quill shaft 40 adjacent a truck wheel 10 and is provided with a plurality of sockets in which a rubber cushioning member 42 is arranged about a coupling socket or cup 43. A coupling or driving pin 44 is mounted in each of the sockets 43 and is secured in a complementary opening in the wheel 10. This provides flexible and resilient cushioned driving connections between the wheels 10 of the truck and the quill shafts 40, thereby further minimizing the transmission of undesirable vibrations from the wheels 10 to the truck driving motor.

Repair of the reduction gearing is facilitated by forming the gear casing 19 with removable lower sections 45 which are secured by bolts 46 to the upper portion of the gear casing 19. The gear casing 19 also advantageously provides a lubricant reservoir for the reduction gearing and the supporting bearings of the reduction gearing and the quill shaft coupling 34, thereby including the weight of the lubricant carried by the gear casing as sprung weight and further minimizing the unsprung weight of the construction. Furthermore, repairs to the motor are facilitated by providing an opening 47 through the side frames 12 and 13 on the side of the truck opposite the gearing. This opening is made larger than the diameter of the armature 48 of the driving motor and is adapted to be closed by a bearing housing cover plate 49 secured by bolts 50 to the side frame 12. A bearing housing is formed on the cover plate 49 and is arranged to support the adjacent end of the armature shaft 24 in a bearing 51, so that removal of the cover plate 49 and the bearing 51 permits easy withdrawal of the armature 48 and the pinion 25 without removal of the motor from the truck.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States, is:

1. A truck including wheels and axles, a truck frame, means for resiliently supporting said truck frame on said wheels and axles, said truck frame having side frame members, a motor arranged centrally of said frame and having a frame forming a transom for said truck frame, a quill shaft about each of said axles having a flexible driving connection with said wheels, means including reduction gearing on each side of said transom for providing a driving connection between said motor and each of said quill shafts, and means including a gear casing member having bearings for supporting said reduction gearing and an end of each of said quill shafts and for providing a lubricant reservoir for said gearing.

2. A truck including wheels and axles, a truck frame, means for resiliently supporting said truck frame on said wheels and axles, said truck frame having side frame members, a motor having a frame forming a transom for said truck frame, a quill shaft about each of said axles having a flexible rubber cushioned driving connection with said wheels, means including reduction gearing on each side of said transom for providing a driving connection between said motor and each of said quill shafts, and means including a longitudinally extending gear casing member having bearings for supporting said reduction gearing and an end of each of said quill shafts.

3. A truck including wheels and axles, a truck frame, means for supporting said truck frame on said wheels and axles, a motor arranged between said axles and having a frame forming a transom for said truck frame, a quill shaft about each of said axles having a flexible driving connection with said wheels, a quill shaft coupling for each of said quill shafts having a flexible driving connection with each respective quill shaft, means including reduction gearing on each side of said transom for providing a driving connection between said motor and each of said quill shaft couplings, and means including a longitudinally extending gear casing member mounted on said transom and having bearings for supporting said reduction gearing and an end of each of said quill shafts and for providing a lubricant reservoir for said gearing.

OLE K. KJOLSETH.